US011126328B2

(12) United States Patent
Chi et al.

(10) Patent No.: US 11,126,328 B2
(45) Date of Patent: Sep. 21, 2021

(54) APPLICATION PROCESSING METHOD AND APPARATUS, STORAGE MEDIUM, AND COMPUTING DEVICE

(71) Applicant: Tencent Technology (Shenzhen) Company Limited, Shenzhen (CN)

(72) Inventors: Yanjia Chi, Shenzhen (CN); Wei Li, Shenzhen (CN); Xialun Lai, Shenzhen (CN); Leteng Weng, Shenzhen (CN); Hao Chen, Shenzhen (CN); Liang Ma, Shenzhen (CN); Shun Li, Shenzhen (CN); Danxiong Lei, Shenzhen (CN); Hongqiang Chen, Shenzhen (CN); Yifu Wang, Shenzhen (CN); Hui Chen, Shenzhen (CN); Sixin Gu, Shenzhen (CN); Kai Li, Shenzhen (CN); Yuewei Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/868,438

(22) Filed: May 6, 2020

(65) Prior Publication Data
US 2020/0264743 A1 Aug. 20, 2020

Related U.S. Application Data

(63) Continuation of application No. PCT/CN2019/071951, filed on Jan. 16, 2019.

(30) Foreign Application Priority Data

Jan. 18, 2018 (CN) .......................... 201810048344.8

(51) Int. Cl.
*G06F 3/0483* (2013.01)
*G06F 9/451* (2018.01)

(52) U.S. Cl.
CPC ............ *G06F 3/0483* (2013.01); *G06F 9/451* (2018.02)

(58) Field of Classification Search
CPC ............................... G06F 3/0483; G06F 9/451
See application file for complete search history.

(56) References Cited

U.S. PATENT DOCUMENTS 9,342,273 B1 * 5/2016 Kumar ...................... G06F 8/20
9,367,305 B1 * 6/2016 Kumar ...................... G06F 8/71
(Continued)

FOREIGN PATENT DOCUMENTS

| CN | 106502736 A | 3/2017 |
|---|---|---|
| CN | 107357644 A | 11/2017 |
| CN | 108196930 A | 6/2018 |

OTHER PUBLICATIONS

Tencent Technology, ISR, PCT/CN2019/071951, dated Apr. 17, 2019, 2 pgs.

(Continued)

*Primary Examiner* — Shen Shiau
(74) *Attorney, Agent, or Firm* — Morgan, Lewis & Bockius LLP

(57) ABSTRACT

An application processing method is performed at a computing device, the method including: displaying a first page of a first child application managed by a parent application, the first page of the first child application including a child application jump portal; detecting a child application jump operation corresponding to the first page in response to a user selection of the child application jump portal; presenting, in the first page candidate child application identifiers according to the child application jump operation; determining a child application identifier that is selected from the presented child application identifiers through a user selection operation; and generating, by using a second child application corresponding to the user-selected child appli- (Continued)

cation identifier, a second page that is displayed by covering the first page already displayed and that belongs to the second child application.

12 Claims, 10 Drawing Sheets

(56) References Cited

U.S. PATENT DOCUMENTS

| | | | | |
|---|---|---|---|---|
| 9,582,268 | B2* | 2/2017 | Kumar | G06F 8/20 |
| 9,804,898 | B2* | 10/2017 | Han | G06F 9/451 |
| 10,126,944 | B2* | 11/2018 | Wang | G06F 3/04842 |
| 10,740,114 | B2* | 8/2020 | Hu | G06F 9/541 |
| 10,776,567 | B2* | 9/2020 | You | G06F 40/117 |
| 10,831,567 | B2* | 11/2020 | Wu | G06F 9/44505 |
| 10,877,826 | B2* | 12/2020 | Hu | G06F 9/44526 |
| 10,929,942 | B2* | 2/2021 | Wang | H04L 51/10 |
| 10,956,035 | B2* | 3/2021 | Wang | G06F 3/04842 |
| 2008/0103860 | A1 | 5/2008 | Hilerio et al. | |
| 2011/0093895 | A1* | 4/2011 | Lee | H04N 21/8173 725/40 |
| 2011/0276919 | A1* | 11/2011 | Massand | G06F 9/44526 715/810 |
| 2013/0091513 | A1* | 4/2013 | Underdal | G06F 9/4843 719/328 |
| 2013/0120295 | A1* | 5/2013 | Kim | G06F 3/0481 345/173 |
| 2013/0120447 | A1* | 5/2013 | Kim | G06F 3/0481 345/629 |
| 2013/0267250 | A1* | 10/2013 | Lin | G06F 3/04886 455/456.3 |
| 2014/0089947 | A1* | 3/2014 | Han | G06F 9/54 719/328 |
| 2014/0095638 | A1* | 4/2014 | Chen | H04L 51/04 709/206 |
| 2016/0162327 | A1* | 6/2016 | Osamu | G06F 3/0412 715/778 |
| 2016/0231870 | A1* | 8/2016 | Summa | G06F 9/542 |
| 2016/0294744 | A1* | 10/2016 | Zou | H04L 67/306 |
| 2016/0350081 | A1* | 12/2016 | Kumar | G06F 8/30 |
| 2016/0350105 | A1* | 12/2016 | Kumar | G06F 8/20 |
| 2017/0102966 | A1* | 4/2017 | Dallala | G06F 9/4843 |
| 2017/0279869 | A1* | 9/2017 | Neagu | H04L 67/1095 |
| 2018/0321820 | A1* | 11/2018 | Burman | G06F 16/2282 |
| 2018/0373427 | A1* | 12/2018 | Wang | G06F 3/04842 |
| 2019/0102201 | A1* | 4/2019 | Hu | G06F 9/449 |
| 2019/0187758 | A1* | 6/2019 | Lee | G06F 1/16 |
| 2019/0213019 | A1* | 7/2019 | Hu | G06F 9/44578 |
| 2019/0220304 | A1* | 7/2019 | Hu | G06F 9/445 |
| 2019/0220332 | A1* | 7/2019 | Wu | G06F 9/44526 |
| 2019/0266034 | A1* | 8/2019 | Wang | G06T 1/0007 |
| 2019/0272193 | A1* | 9/2019 | Hu | G06F 16/955 |
| 2019/0347146 | A1* | 11/2019 | Hu | G06F 9/44526 |
| 2019/0349411 | A1* | 11/2019 | Luo | H04L 67/12 |
| 2019/0361737 | A1* | 11/2019 | Hu | G06F 9/451 |
| 2019/0378087 | A1* | 12/2019 | Easter | H04L 67/24 |
| 2019/0384801 | A1* | 12/2019 | Li | G06F 16/9537 |
| 2020/0050652 | A1* | 2/2020 | You | G06F 40/117 |
| 2020/0142573 | A1* | 5/2020 | Rathod | H04L 67/02 |
| 2020/0278949 | A1* | 9/2020 | Wang | G06F 3/0482 |
| 2020/0310839 | A1* | 10/2020 | Verma | G06F 11/3438 |
| 2020/0357389 | A1* | 11/2020 | Bai | G06F 40/51 |
| 2020/0379779 | A1* | 12/2020 | Liang | G06F 9/44505 |
| 2021/0004280 | A1* | 1/2021 | Wu | G06F 9/542 |
| 2021/0073058 | A1* | 3/2021 | Hu | G06F 9/44526 |

OTHER PUBLICATIONS

Tencent Technology, WO, PCT/CN2019/071951, dated Apr. 17, 2019, 5 pgs.

Tencent Technology, IPRP, PCT/CN2019/071951, dated Jul. 21, 2020, 6 pgs.

* cited by examiner

APPLICATION PROCESSING METHOD AND APPARATUS, STORAGE MEDIUM, AND COMPUTING DEVICE

RELATED APPLICATION

This application is a continuation application of PCT Application No. PCT/CN2019/071951, entitled "APPLICATION PROGRAM PROCESSING METHOD, APPARATUS, STORAGE MEDIUM AND COMPUTING DEVICE" filed on Jan. 16, 2019, which claims priority to Chinese Patent Application No. 201810048344.8, entitled "APPLICATION PROCESSING METHOD AND APPARATUS, STORAGE MEDIUM, AND COMPUTING DEVICE" filed with the Chinese National Intellectual Property Administration on Jan. 18, 2018, all of which are incorporated by reference in their entirety.

FIELD OF THE TECHNOLOGY

This application relates to the field of computer technologies, and in particular, to an application processing method and apparatus, a storage medium, and a computing device.

BACKGROUND OF THE DISCLOSURE

An application is a code instruction sequence that may be performed by a terminal having an information processing capability, such as a computer, to obtain a result, or a symbolized instruction sequence or a symbolized statement sequence that may be automatically converted into a code instruction sequence. Currently, a user may install various applications on a terminal, for example, a photography application, a social networking application having a plurality of users including the user, and a mail application, so that various functions may be implemented by the applications installed on the terminal, such as a photography function, a social function, or an email management function.

Currently, when a user intends to obtain data of another application in the process of using an application, it is necessary to exit the currently used application according to a user instruction, and restart and use the application to which the data to be obtained belongs. Therefore, use of current applications needs a series of time-consuming operations, which is very cumbersome, causing relatively low use efficiency of the applications.

SUMMARY

According to embodiments provided in this application, an application processing method and apparatus, a storage medium, and a computing device are provided.

An application processing method, performed by a computing device, includes:

displaying a first page of a first child application managed by a parent application, wherein the parent application is a social networking application having a plurality of users and the first child application is hosted by the parent application and accessible to a subset of the plurality of users and the first page of the first child application includes a child application jump portal;

detecting a child application jump operation corresponding to the first page in response to a user selection of the child application jump portal;

presenting, in the first page, candidate child application identifiers according to the child application jump operation;

determining a child application identifier that is selected from the presented child application identifiers through a user selection operation; and generating, by using a second child application corresponding to the user-selected child application identifier, a second page that is displayed by covering the first page already displayed and that belongs to the second child application.

A non-volatile storage medium storing computer-readable instructions is provided, the computer-readable instructions, when executed by one or more processors, causing the one or more processors to perform the aforementioned application processing method.

A computing device includes memory and a processor, the memory storing computer-readable instructions, and the computer-readable instructions, when executed by a computing device having the processor, causing the computing device to perform the aforementioned application processing method.

Details of one or more embodiments of this application are provided in the accompany drawings and description below. Other features, objectives, and advantages of this application become apparent from the specification, the accompanying drawings, and the claims.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

To make the objectives, technical solutions, and advantages of this application clearer and more comprehensible, the following further describes this application in detail with reference to the accompanying drawings and the embodiments. It is to be understood that the specific embodiments described herein are only used for describing this application, but are not intended to limit this application.

Figure 1:
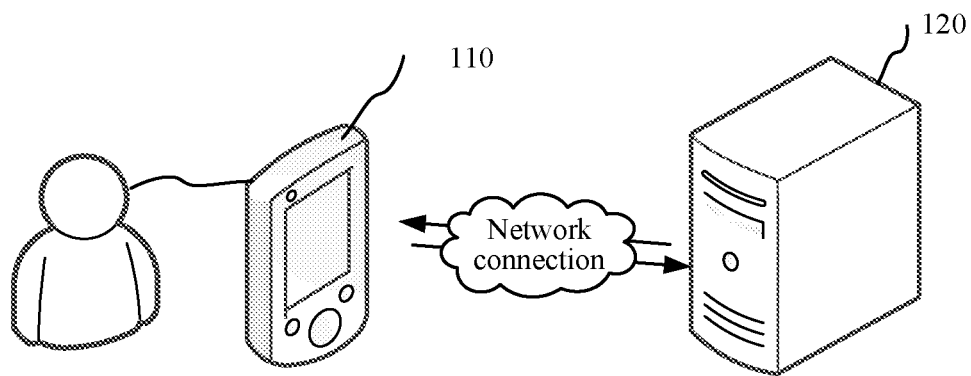
FIG. 1 is a diagram of an application environment of an application processing system in an embodiment.

FIG. 1 is a diagram of an application environment of an application processing system in an embodiment. Referring to FIG. 1, the application processing system includes a terminal 110 and a server 120. The terminal 110 is connected to the server 120 by using a network. An operating system runs on the terminal 110, and a parent application runs in the operating system. The terminal 110 implements an application processing method by using the parent application, to achieve a jump between child applications by using the parent application. The terminal 110 may specifically create a child application logic layer processing unit and a corresponding child application view layer processing unit by using the parent application. The child application view layer processing unit may be configured to generate a child application page. The server 120 is also configured to verify a jump relationship of a jump between child applications. In a case that the jump relationship is allowed, the jump between the child applications is performed by the terminal.

Figure 2:
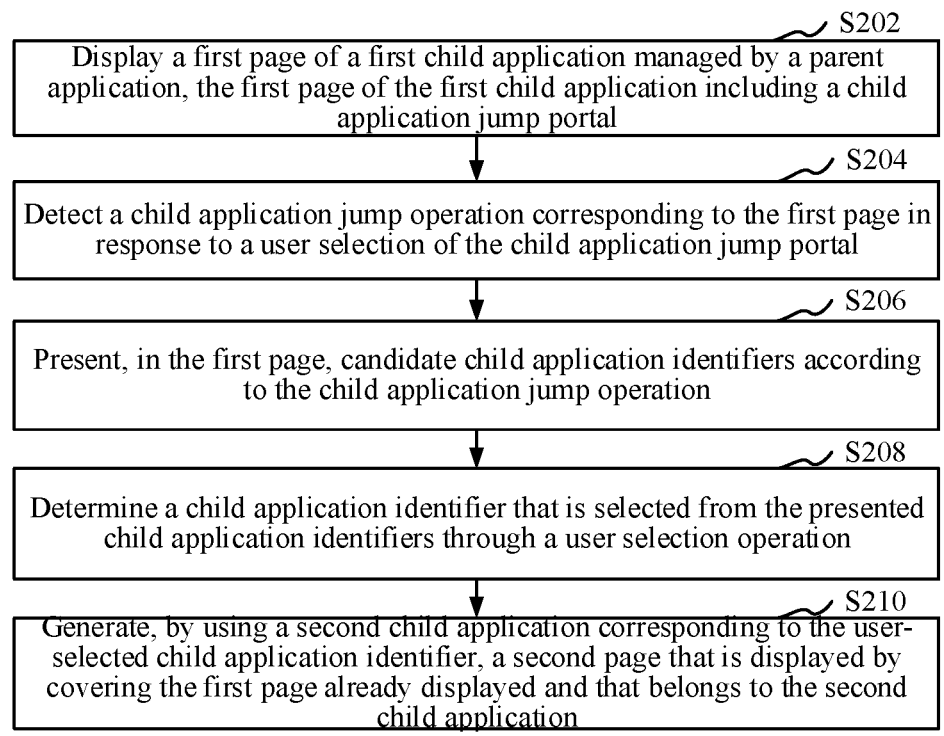
FIG. 2 is a schematic flowchart of an application processing method in an embodiment.

FIG. 2 is a schematic flowchart of an application processing method in an embodiment. In this embodiment, the method being applied to the terminal 110 in FIG. 1 is used as an example for description mainly. Referring to FIG. 2, the application processing method specifically includes the following steps:

S202. Display a first page of a first child application managed by a parent application.

Specifically, an operating system is run on the terminal, and the parent application is run in the operating system. The operating system (OS) is a computer program that manages and controls hardware and software resources of the terminal, and is the most fundamental system software directly run on a bare user terminal. An application needs to be run under support of the operating system. The operating system may be a desktop operating system such as a Windows operating system, a Linux operating system, or a Mac OS (an Apple desktop operating system), or may be a mobile operating system such as an iOS (an Apple mobile terminal operating system) or an Android operating system.

The parent application is a native application. The native application is an application that may be directly run in the operating system. The parent application may be a social networking application, a mail application, a game application, or the like. The social networking application has a plurality of users and includes, e.g., an instant messaging application, a social network service (SNS) application, a live broadcast application, or the like. The parent application may be specifically a WeChat program.

The child application is an application that may be managed in an environment provided by the parent application. The child application may be specifically a social networking application separate from the parent application and accessible to a subset of the users of the parent application, a file management application, a mail application, a game application, or the like. The parent application may be specifically a WeChat program, and the corresponding child application may be referred to as an applet.

Figure 3:
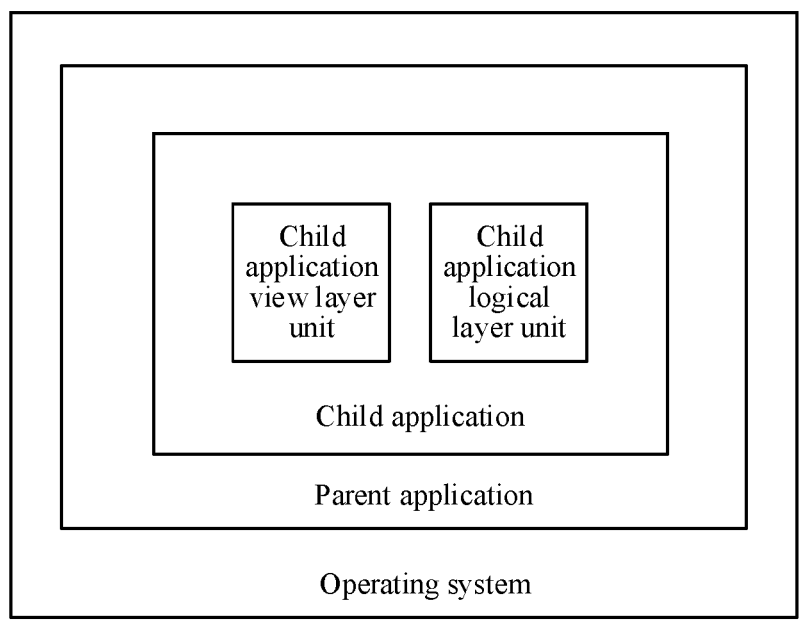
FIG. 3 is a schematic diagram of a relationship among an operating system, a parent application, a child application, and a page of the child application in an embodiment.

FIG. 3 is a schematic diagram of a relationship among an operating system, a parent application, a child application, and a page of the child application in an embodiment. Referring to FIG. 3, the operating system is run on the terminal, the parent application is run in the operating system, and the parent application provides a running environment for the child application. The terminal may create, by using the parent application, a child application logical layer unit and a corresponding child application view layer unit that are used for implementing the child application. The child application logical layer unit may be configured to execute page logic code in a package of the child application, and the child application view layer unit may be configured to execute page structure code and page style code in the package of the child application. The page logic code, the page structure code, and the page style code in the package may be collectively referred to as page code.

In an embodiment, when a child application is to be run in the environment provided by the parent application, the terminal may create, by using the parent application, the child application logic layer unit and the corresponding child application view layer unit for implementing the child application, and obtain page code corresponding to the child application. The terminal then may execute page structure code in the page code by using the child application view layer unit, select a component according to a component identifier specified in the page structure code, then execute page style code in the page code to organize the selected component, apply page data to the component and perform rendering to form a page of the child application and present the page, thereby displaying the page of the child application run by the parent application.

The page data is data required for rendering the page of the child application. The page data may be page initial data defined in the page logic code of the child application, or may be data pulled from a storage position specified by the page logic code of the child application, or may further be data generated after the child application logic layer unit processes an event transmitted from the child application view layer unit.

The page structure code is code that defines page composition. The page structure code may include identifiers of components on a page. The page style code is code that defines a page style. The page logic code is code that defines processing logic of a corresponding child application page.

The component may be a common component shared by pages of different child applications provided by the parent application, or may be a private component provided by the child application and exclusively used by the child application. The component has a visual form, and is a composition unit of the page of the child application. The component has a unique identifier, which may be a name of the component.

Both the first child application herein and a second child application in the following context are child applications, but are different child applications.

S204. Detect a child application jump operation corresponding to the first page in response to a user selection of the child application jump portal.

The child application jump operation is an operation for triggering a child application jump. The child application jump operation corresponding to the page is an operation for triggering a jump from the child application to which the currently displayed page belongs to another child application.

Specifically, the terminal may detect or monitor, by using the child application to which the currently displayed page belongs, a predefined trigger operation corresponding to the currently displayed page, and notify the parent application when detecting the predefined trigger operation, so that the parent application determines that a child application jump operation is detected. The terminal may alternatively directly detect or monitor, by using the parent application, a predefined trigger operation corresponding to the currently displayed page, and determine that a child application jump operation is detected when detecting the predefined trigger operation.

The predefined trigger operation may be an operation on a page control in the page, for example, a touch operation or a cursor clicking operation on the page control. The trigger operation may alternatively be a pressing operation on a predefined physical button, or a shaking operation triggered when the page of the child application is displayed, or a dragging operation on the page of the child application, or the like.

S206. Present, in the first page, candidate child application identifiers according to the child application jump operation.

The child application identifier is used for uniquely identifying a child application. The child application identifier may be a character string that includes at least one type of character, including digit, letter, or symbol.

The candidate child application identifier may be a child application identifier of a child application that has been run by the parent application historically. Therefore, the child application jumped to has been run in the parent application, thereby avoiding time spent on downloading a package of a child application and then running the child application.

The candidate child application identifier may alternatively be a child application identifier that meets a geographical location proximity condition between an associated geographical location and a local geographical location. In this way, the child application identifiers may be sorted and displayed according to a descending order of distances from the local geographic location, and a user may position a required child application by using the geographic location, which is convenient and fast.

The candidate child application identifier may alternatively be a child application identifier of which a corresponding application type is similar to an application type of the child application to which the currently displayed page belongs. When desired page content is not found in the page of the current child application, the user may quickly jump to a page of a similar child application to continuously search for the desired page content.

The candidate child application identifier may alternatively be a child application identifier filtered according to user behavior data corresponding to a currently logged-in user identifier. The child application filtered according to the user behavior data is most likely a child application in which the user is interested, thereby improving the use efficiency of the child application.

Specifically, the terminal may obtain, by using the parent application according to the child application jump operation, candidate child applications, and further present the candidate child application identifiers.

In an embodiment, the terminal may further detect, by using the parent application, a slide operation corresponding to the presentation of the candidate child application identifiers, and jump to the currently displayed child application identifiers by using the slide operation.

S208. Determine a child application identifier that is selected from the presented child application identifiers through a user selection operation.

Specifically, the terminal may detect, by using the parent application, the selection operation on the displayed child application identifiers, so as to determine the child application identifier selected by the selection operation.

S210. Generate, by using a second child application corresponding to the user-selected child application identifier, a second page that is displayed by covering the first page already displayed and that belongs to the second child application.

Specifically, the terminal may execute, by using a child application view layer unit corresponding to the second child application, page structure code corresponding to the second child application, select a component according to a component identifier specified in the page structure code, then execute page style code corresponding to the second child application to organize the selected component, and apply page data to the component and perform rendering to generate a page that is displayed by covering the page already displayed and that belongs to the second child application.

In an embodiment, the terminal may display, by using the parent application, the page generated by the child application view layer unit corresponding to the second child application on the already displayed page to cover the already displayed page. In this way, when using the child application, a user may freely switch the child application through a parent application level-based jump provided by the parent application, and a child application developer does not need to independently develop a jump function for the child application, thus reducing development costs and development workloads of the child application, and improving the access quantity of the child application in the parent application.

In an embodiment, after the child application view layer unit corresponding to the second child application generates the page, the page may also be automatically displayed by covering the already displayed page.

In an embodiment, the page generated by the second child application, which is displayed by covering the page already displayed and belongs to the second child application, may be a home page of the second child application, or may be a specific page implementing settings.

According to the foregoing application processing method, the parent application is run on the operating system, and the child application can be run by the parent application to display the page that belongs to the child application. After detecting the child application jump operation corresponding to the currently displayed page, the terminal automatically presents the candidate child application identifiers according to the child application jump operation. In this way, the user may autonomously select, from the candidate child application identifiers, the second child application to be jumped to, so that the second child application generates the page that is displayed by covering the page already displayed and that belongs to the second child application, thus automatically implementing the jump between child applications, avoiding time spent on exiting the currently used application and restarting the application to be jumped to, and improving the use efficiency of the application.

In an embodiment, S204 includes: detecting a child application jump operation acting on a child application jump portal of the page. S206 includes: drawing, according to the child application jump operation, a floating window at a top view layer relative to a view layer of the page; and presenting the candidate child application identifiers in the floating window.

The child application jump portal is an operation portal for triggering the child application jump operation. The child application jump portal may be specifically a page control, an icon, a link or a virtual button, or the like. The child application jump operation may be specifically a touch operation or a click operation acting on the child application jump portal. The touch operation or the click operation may be a short-time operation, or may be a long-press operation.

The view layer is a layer for drawing page content. The floating window is a window that may have a customized display position and display size. The view layer where the floating window is located is always the top view layer. The floating window may be rectangular or round, or of an irregular shape.

Specifically, the terminal may detect or monitor, by using the child application to which the currently displayed page belongs, the child application jump operation acting on the child application jump portal of the page, and notify the parent application when detecting the child application jump operation, so that the parent application detects the child application jump operation. The terminal may alternatively directly detect or monitor, by using the parent application, the child application jump operation acting on the child application jump portal of the page.

Further, after detecting the child application jump operation acting on the child application jump portal of the page, the parent application run on the terminal draws, according to the child application jump operation, the floating window at the top view layer relative to the view layer of the currently displayed page, and then presents the candidate child application identifiers in the floating window. The display position and the display size of the floating window may be uniformly set by a server corresponding to the parent application, or may be customized by a user.

In an embodiment, the child application jump portal may belong to the page of the child application. The server corresponding to the parent application may uniformly set a child application jump portal configuration file. When developing the page of the child application, a page developer of the child application configures the child application jump portal in the developed page according to the child application jump portal configuration file that is uniformly set.

In an embodiment, the child application jump portal may not belong to the page of the child application. The terminal may generate, by using the parent application, a navigation bar including the child application jump portal, and display the navigation bar by splicing it with the page of the child application.

Figure 4:
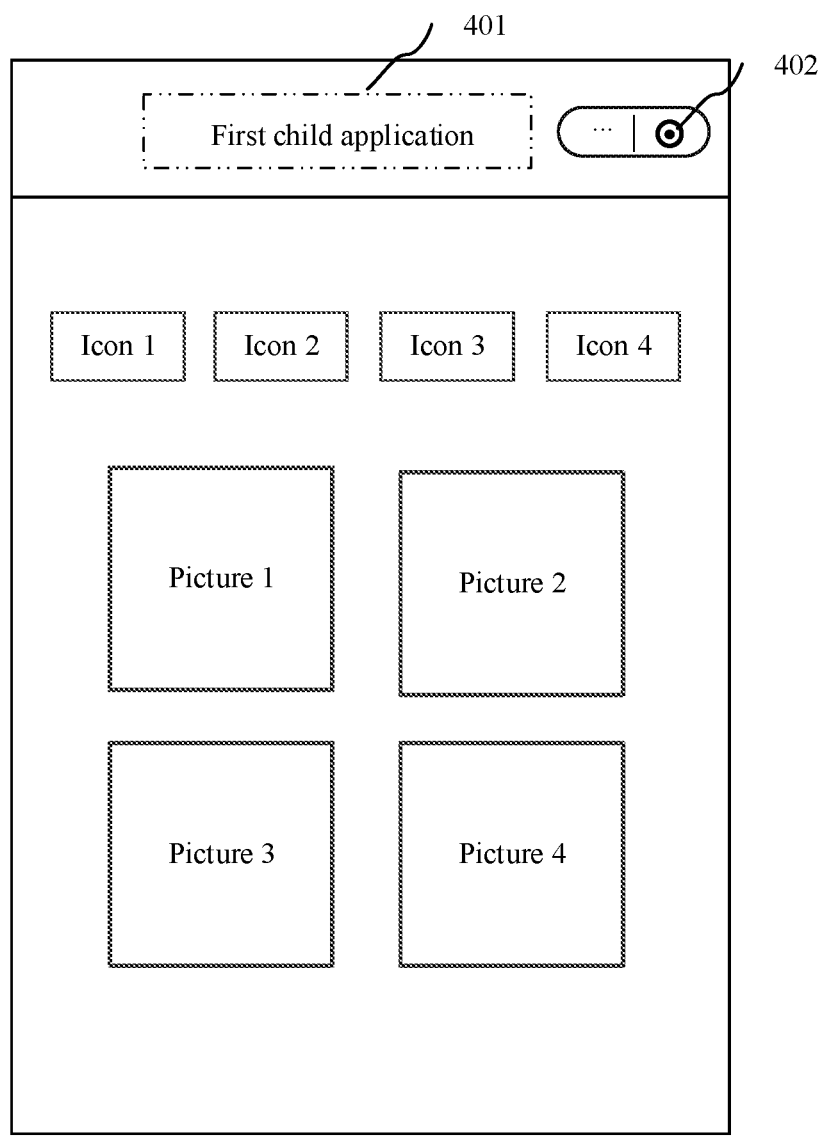
FIG. 4 is a schematic diagram of an interface displaying a page of a first child application in an embodiment.
Figure 5:
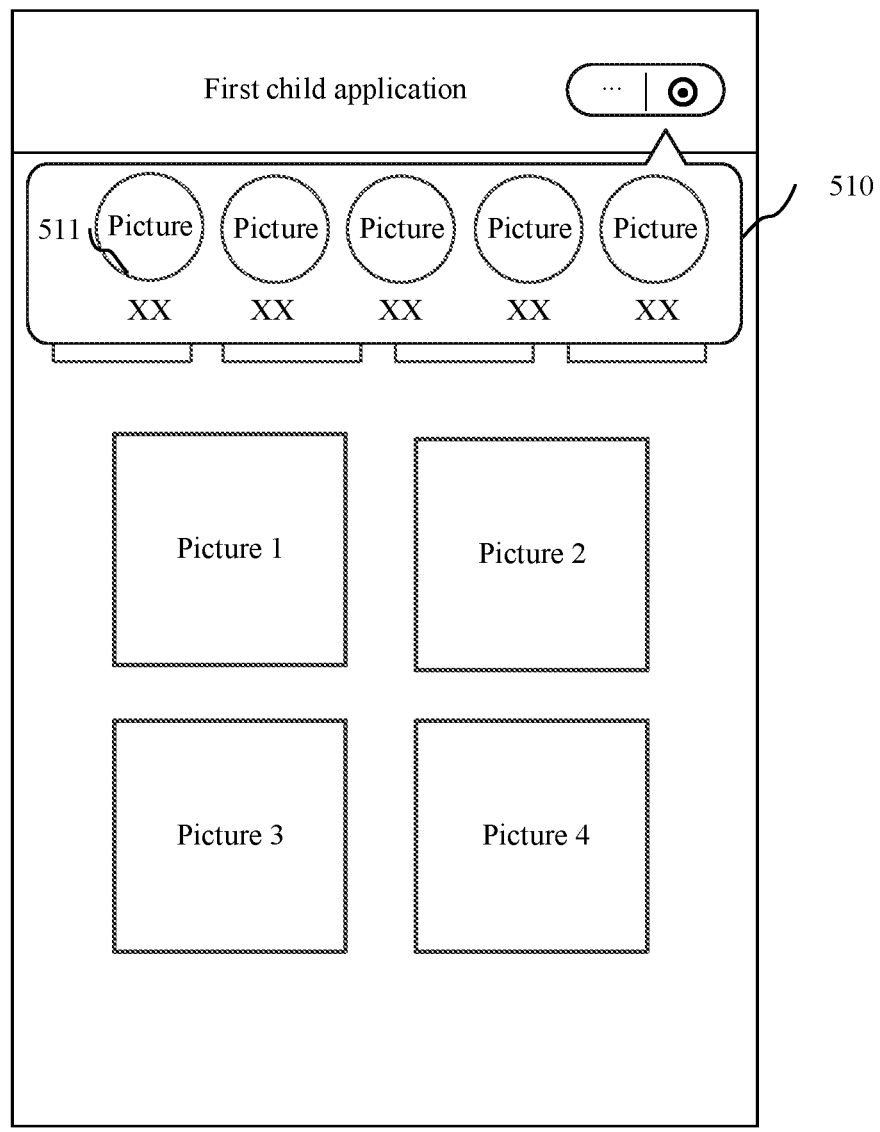
FIG. 5 is a schematic diagram of an interface presenting candidate child application identifiers in an embodiment.

For example, FIG. 4 is a schematic diagram of an interface displaying a page of a first child application in an embodiment. Referring to FIG. 4, the interface includes a child application identifier 401 and a child application jump portal 402. The terminal may detect, by using the parent application, a child application jump operation (for example, a long-press operation) acting on the child application jump portal 402, draw a floating window as shown in FIG. 5 at a top view layer relative to a view layer of a currently displayed page, and further present candidate child application identifiers in the floating window. Referring to FIG. 5, the schematic diagram includes a floating window 510 and candidate child application identifiers 511 displayed in the floating window 510.

Figure 6:
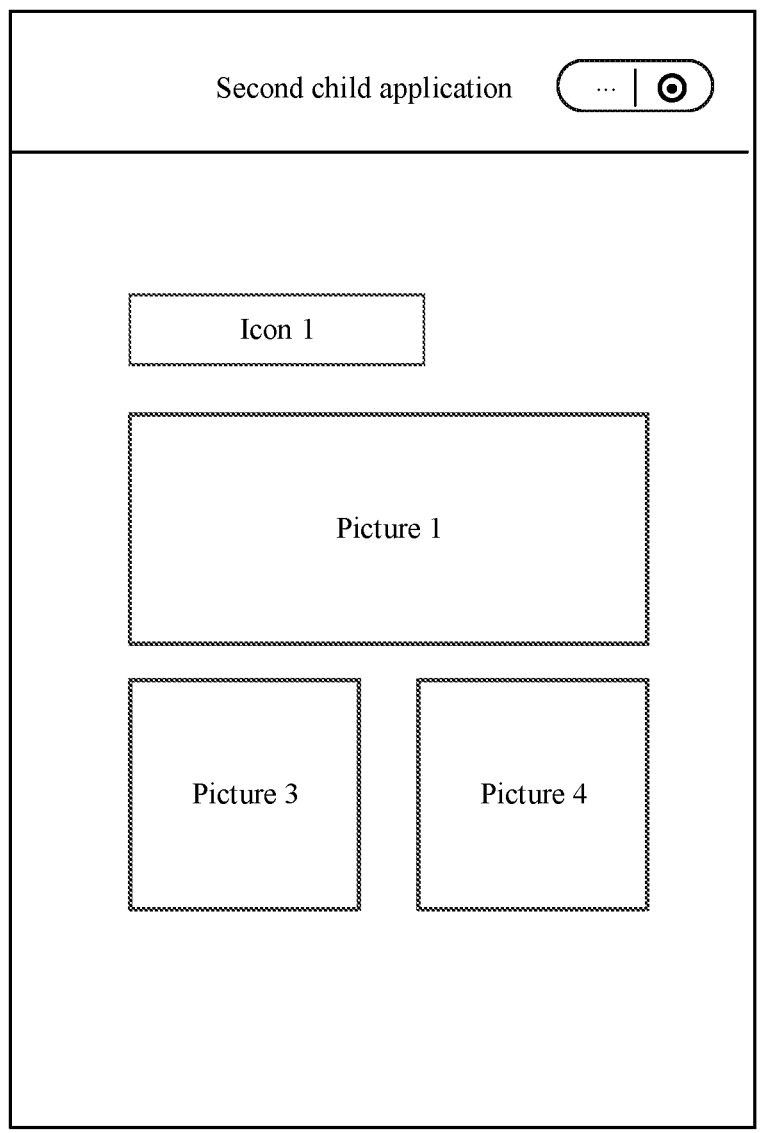
FIG. 6 is a schematic diagram of an interface displaying a page of a second child application in an embodiment.

The terminal may detect, by using the parent application, a selection operation (for example, a touch operation) acting on the presented child application identifiers, determine a child application identifier that is selected from the presented child application identifiers through the selection operation, and jump to a page of a second child application as shown in FIG. 6.

For example, it is assumed that the parent application is WeChat, and the child application is an applet. For example, when using a JD shopping applet, a user does not find desired goods. In this case, the user may open a Vipshop applet through a multitasking interface. In the way, in a case that an applet developer does not provide a jump function, the user may freely switch to another applet through a system-level jump provided by WeChat. The multitasking interface herein is the floating window for presenting candidate child application identifiers.

In the foregoing embodiments, when using a child application, the user may freely switch the child application through a parent application level-based jump provided by the parent application, which is convenient and fast.

In an embodiment, S204 includes: detecting a child application jump operation triggered by dragging the page. S206 includes: presenting, according to the child application jump operation, the candidate child application identifiers in a page area formed by dragging the page.

The child application jump operation triggered by dragging the page may be specifically be a page drag operation. The page drag operation may be specifically an eye-control page drag operation, a manual page drag operation, or the like. The eye-control page drag operation may be specifically controlling, through pupil position movement, the terminal to drag the page. The manual page drag operation may be specifically controlling, through a finger touch slide operation, the terminal to drag the page.

Specifically, when the terminal drags the page by using the parent application, a page area where no page content is displayed is formed between a page area where the movement occurs and a top end of a display screen or a lower boundary of a navigation bar. The terminal may display, by using the parent application, the candidate child application identifiers in the formed page area. It is to be understood that, no page content being displayed herein does not mean that the page area does not display any content, and an identifier character, a picture, an animation or the like such as "loading" representing page refresh may be displayed.

Figure 7:
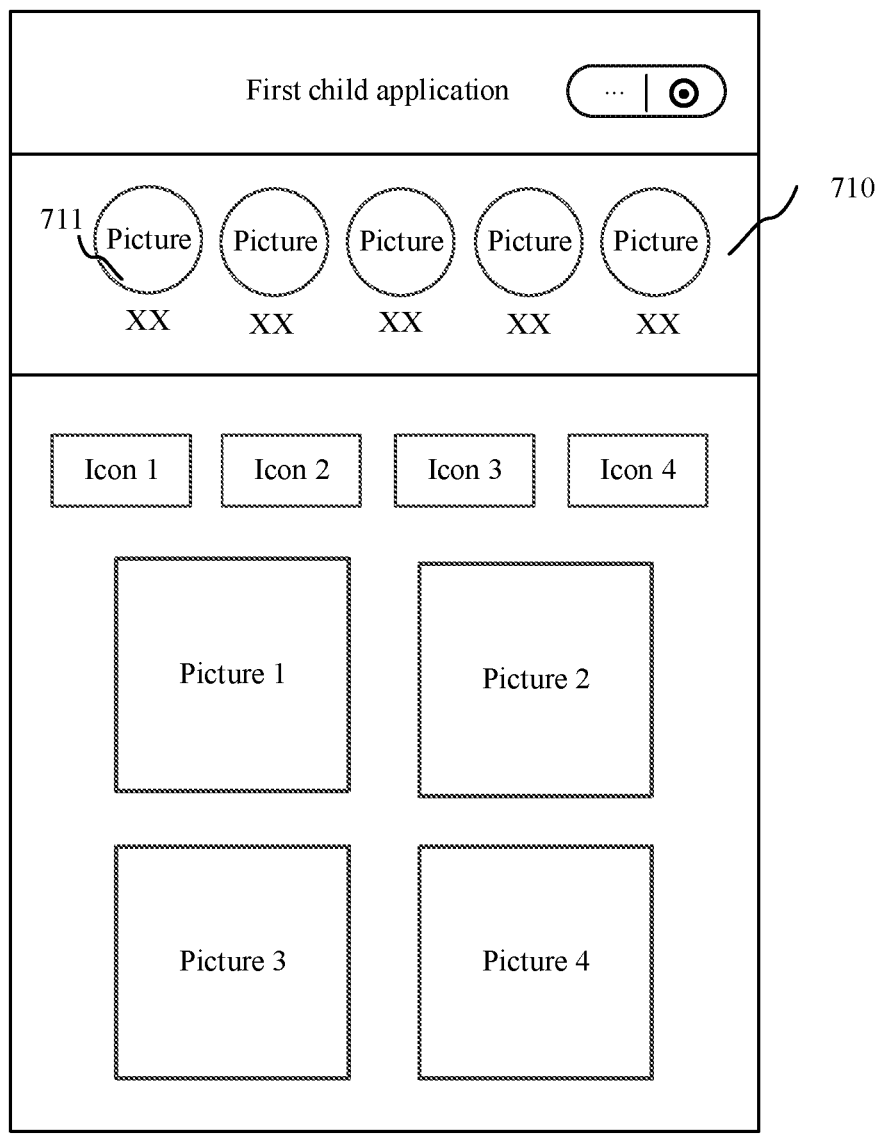
FIG. 7 is a schematic diagram of an interface presenting candidate child application identifiers in another embodiment.

For example, FIG. 7 is a schematic diagram of an interface presenting candidate child application identifiers in an embodiment. Referring to FIG. 7, the interface includes a page area 710 formed by dragging a page and candidate child application identifiers 711 presented in the page area 710.

In this embodiment, when using a child application, a user may freely switch the child application through a parent application level-based jump provided by a parent application, which is convenient and fast. In addition, the presented child application identifiers do not cover a currently displayed page of the child application, and do not affect the user's normal use of the child application currently running in the foreground.

In an embodiment, different types of operations, for example, a child application jump operation or a page refresh operation, may be triggered by dragging the page to form different drag distances. In this embodiment, the terminal may set page drag distance ranges corresponding to different operations respectively in advance. An operation triggered by dragging the page is determined according to a page drag distance range to which a page drag distance of the currently dragged page belongs. In this way, triggering of various operations can be accurately and conveniently controlled, to avoid errors.

In an embodiment, the application processing method further includes: obtaining a jump path for recording a child application jump relationship; deleting a child application identifier located after the selected child application identifier from the jump path in a case that the selected child application identifier exists in the jump path; and adding the selected child application identifier to the end of the jump path in a case that the selected child application identifier does not exist in the jump path.

The jump path includes child application identifiers that are sorted according to a jump sequence of child applications, and records a child application jump relationship. For example, a jump path recording a child application jump relationship of "a jump from a child application A to a child application B and then to a child application C" is A→B→C.

Specifically, the terminal may obtain, by using the parent application, the jump path for recording the child application jump relationship, traverse child application identifier in the obtained jump path, and compare the traversed child application identifier with the selected child application identifier. When determining that the traversed child application identifier is the same as the selected child application identifier, the parent application deletes a child application identifier located after the traversed child application identifier from the jump path. When determining that the traversed child application identifiers are all different from the selected child application identifier, the parent application directly adds the selected child application identifier to the end of the jump path.

For example, it is assumed that the jump path obtained by the terminal by using the parent application is "A→B→C". If it is intended to jump from the child application corresponding to C to the child application corresponding to A currently, and in this case, A exists in "A→B→C", the child application identifier after A in "A→B→C" is deleted, to obtain "A". If it is intended to jump from the child application corresponding to C to the child application corresponding to D, and in this case, D does not exist in "A→B→C", D is directly added to the end of "A→B→C", to obtain "A→B→C→D".

It is to be understood that, the child application is run in a single instance in an environment provided by the parent application, and does not support a plurality of running instances. Each time a child application is jumped to, the child application clears a historically displayed page saved in a page stack, and regenerate a page. In this way, a context during a jump of an original child application is lost. If multiple identical programs are kept in a jump chain, a jumped-to state cannot be restored when the child application is repeatedly returned to. Therefore, preferably, when a child application already existing in a jump path is jumped to during continuous jumps, a jump relationship after the child application is deleted from the jump path. In addition, after the jump relationship is deleted, a background running state of the child application in the jump relationship is ended, to reduce memory occupation and power consumption of the terminal.

In this embodiment, when a jump between child applications is performed in the environment provided by the parent application, a child application jump relationship is recorded, so that the child applications that have been visited can be returned to step by step.

In an embodiment, the application processing method further includes: obtaining a return instruction corresponding to a currently displayed page; determining, in response to the return instruction, a child application identifier corresponding to the currently displayed page; searching for a child application identifier that is adjacent to the determined child application identifier and that is located before the determined child application identifier in the jump path; and returning to a page that is displayed during a jump of a child application corresponding to the found child application identifier.

The return instruction is an instruction for returning to a previously started child application. The terminal may detect or monitor, by using the parent application, an event triggered in the currently displayed page. The event is used for triggering a return from a child application to which the currently displayed page belongs, to a previously started child application. The event may be a trigger operation for an operation portal such as an icon or a virtual button, or a trigger operation for the currently displayed page. The trigger operation may be a touch operation, a click operation, a slide operation, or the like.

Specifically, after obtaining the return instruction by using the parent application, the terminal determines, in response to the return instruction, a child application identifier corresponding to the currently displayed page, then searches for a child application identifier that is adjacent to the determined child application identifier and that is located before the determined child application identifier in the jump path, and returns to a page that is displayed during a jump of a child application corresponding to the found child application identifier.

After the terminal generates, by using the second child application, a page that belongs to a second child application to cover the currently displayed page, the covered page that belongs to the first child application is saved in the page stack. During a return from the second child application to the first child application, the page that belongs to the first child application and that is stored in the page stack is directly returned to.

In this embodiment, a processing manner of returning to the child application after the jump from the child application is provided, so that when it is intended to return to the child application that has been used, it is possible to directly return in the parent application, thus avoiding time spent on exiting the currently used application and restarting the application to be returned to, and improving the use efficiency of the application. In addition, when returning to a previously running child application, the user directly and quickly returns to a page that is displayed during the jump of the child application to be returned to, so that the user may continue operations on the page, thus improving the convenience of the application.

In an embodiment, the child application includes a third-party child application and a native plug-in child application. The native plug-in child application is a child application developed by a developer of the parent application, to implement a parent application plug-in function. The native plug-in child application may be, for example, a nearby portal child application, or a scan child application. For a user, a page structure and a page style of a page of the native plug-in child application are consistent with those of a parent application page. The third-party child application is a child application developed by a third-party service provider registered in an open service platform corresponding to the parent application. The page of the native plug-in child application differs from a page of the third-party child application.

In an embodiment, the candidate child application identifiers are all child application identifiers of third-party child applications. In this way, a third-party child application developer does not need to independently develop a jump function for the child application, thereby reducing development costs and development workloads of the child application, and improving the access quantity of the third-party child application in the parent application.

In an embodiment, the application processing method further includes: continuously performing the step of presenting candidate child application identifiers according to the child application jump operation in a case that the child application jump operation is a first-type jump operation;

switching to a page of the parent application according to the child application jump operation in a case that the child application jump operation is a second-type jump operation; and triggering to obtain, through the page of the parent application, a child application identifier to be jumped to; and generating, by using the second child application corresponding to the obtained child application identifier, a page that is displayed by covering the page already displayed and that belongs to the second child application.

The first-type jump operation and the second-type jump operation are two different operations that trigger a jump of the child application. The first-type jump operation triggers a child application jump by presenting the candidate child application identifiers. The second-type jump operation triggers a child application jump by switching to the page of the parent application.

Specifically, the terminal may establish a correspondence between child application jump operations and jump types in advance by using the parent application. For example, a short-time operation corresponds to the first-type jump operation, and a long-time operation corresponds to the second-type jump operation. In this way, when detecting a single-click operation by using the parent application, the terminal determines the operation as a first type jump operation, and when detecting a long-time operation, the terminal determines the operation as a second-type jump operation, so that a child application jump is triggered in different manners.

Specifically, the page of the parent application is used for triggering a child application jump. That is, in response to an intention to jump from one child application to another child application, it is necessary to switch to the page of the parent application first, and then trigger the jump through the page.

The page that belongs to the parent application and that is used for triggering a child application jump may be a uniform page. The uniform page may trigger a jump to any child application. The page that belongs to the parent application and that is used for triggering a child application jump may also be pages that belong to the parent application and that are in a one-to-one correspondence with child applications. Each child application has a corresponding page that belongs to the parent application and that is used for starting the child application.

In this embodiment, a child application jump is implemented by switching to a parent application page for triggering the child application jump, thus providing a new approach for the child application jump.

In an embodiment, the application processing method further includes: obtaining a page identifier corresponding to the page switched to and a jump path for recording a child application jump relationship; deleting a child application identifier and a page identifier that are located after the obtained child application identifier from the jump path in a case that the obtained child application identifier exists in the jump path; and sequentially adding the page identifier and the obtained child application identifier to the end of the jump path in a case that the obtained child application identifier does not exist in the jump path.

The jump path includes child application identifiers and/or parent application page identifiers that are sorted according to a child application jump sequence, records a child application jump application, and reflects a child application jump manner. For example, a jump path recording a child application jump application of "a jump from a child application A to a child application C by switching to a page M of a parent application" is A→M→C.

Specifically, the terminal may obtain, by using the parent application, the jump path for recording the child application jump relationship, traverse the child application identifiers in the obtained jump path, and compare the traversed child application identifiers with the obtained child application identifier. When determining that the traversed child application identifier is the same as the obtained child application identifier, the parent application deletes a child application identifier and a page identifier that are located after the traversed child application identifier from the jump path. When determining that the traversed child application identifiers are all different from the obtained child application identifier, the parent application sequentially adds the page identifier and the obtained child application identifier to the end of the jump path.

For example, it is assumed that a jump path obtained by the terminal by using the parent application is "A→M1→B". If it is intended to jump from the child application corresponding to B to the child application corresponding to A through a page M2 of the parent application currently, and in this case, A exists in "A→M1→B", a child application identifier and a page identifier after A in "A→M1→B" are deleted, to obtain "A". If it is intended to jump from the child application corresponding to B to the child application corresponding to C through the page M2 of the parent application currently, and in this case, C does not exist in "A→M1→B", the page identifier and the obtained child application identifier are sequentially added to the end of "A→M1→B", to obtain "A→M1→B→M2→C".

In this embodiment, when a jump between child applications is performed in the environment provided by the parent application, a child application jump relationship that reflects a child application jump manner is recorded, so that the child applications or the parent application page that has been visited can be returned to step by step.

In an embodiment, when performing, by using the parent application, a return operation in response to a return instruction, the terminal may search for a child application identifier or a page identifier that is adjacent to the determined child application identifier and that is located before the determined child application identifier in the jump path. When the found identifier is a child application identifier, the terminal returns to a page that is displayed during a jump of a child application corresponding to the found child application identifier. When the found identifier is a page identifier, the terminal returns to a page corresponding to the found page identifier.

In an embodiment, the application processing method further includes: transmitting, to a server, a jump relationship of a jump from the first child application to the second child application; receiving a verification result corresponding to the jump relationship fed back by the server; and executing, by using the second child application corresponding to the selected child application identifier, the step of generating a page that is displayed by covering the page already displayed and that belongs to the second child application, in a case that the verification result indicates that the jump relationship is allowed.

Specifically, the terminal obtains, by using the parent application, a child application identifier corresponding to a child application to be jumped to, and obtains a child application identifier corresponding to the currently displayed page. The terminal then transmits the two child application identifiers and a jump relationship between the child applications to the server. The server detects whether the received jump relationship between the child applications is allowed. If the received jump relationship between the child applications is prohibited, the server returns default page data. If the received jump relationship between the child applications is allowed, the server returns page data corresponding to the child application to be jumped to.

In other embodiments, the server may further continuously detect, in a case that the received jump relationship between the child applications is allowed, whether the child application to be jumped to is valid. If the child application to be jumped to is valid, the server returns the page data corresponding to the child application to be jumped to. If the child application to be jumped to is invalid, the server returns the default page data.

For example, if the child application A run in the parent application intends to jump to the child application B, the parent application transmits a jump relationship from A to B and the child application identifiers of A and B to the server. The server detects whether a jump from A to B is allowed. If the jump from A to B is not allowed, the server returns the default page data. If the jump from A to B is allowed, the server continuously detects whether B is valid. If B is valid, the server returns page data corresponding to B. If B is invalid, the server returns the default page data.

The default page data is, for example, a page notification indicating that a page cannot be visited, or the like.

In this embodiment, before a jump between child applications is performed, the server verifies whether the jump relationship between the child applications is allowed, and the jump is performed only in a case that the jump relationship is allowed, thus ensuring the security of using the child applications.

Figure 8:
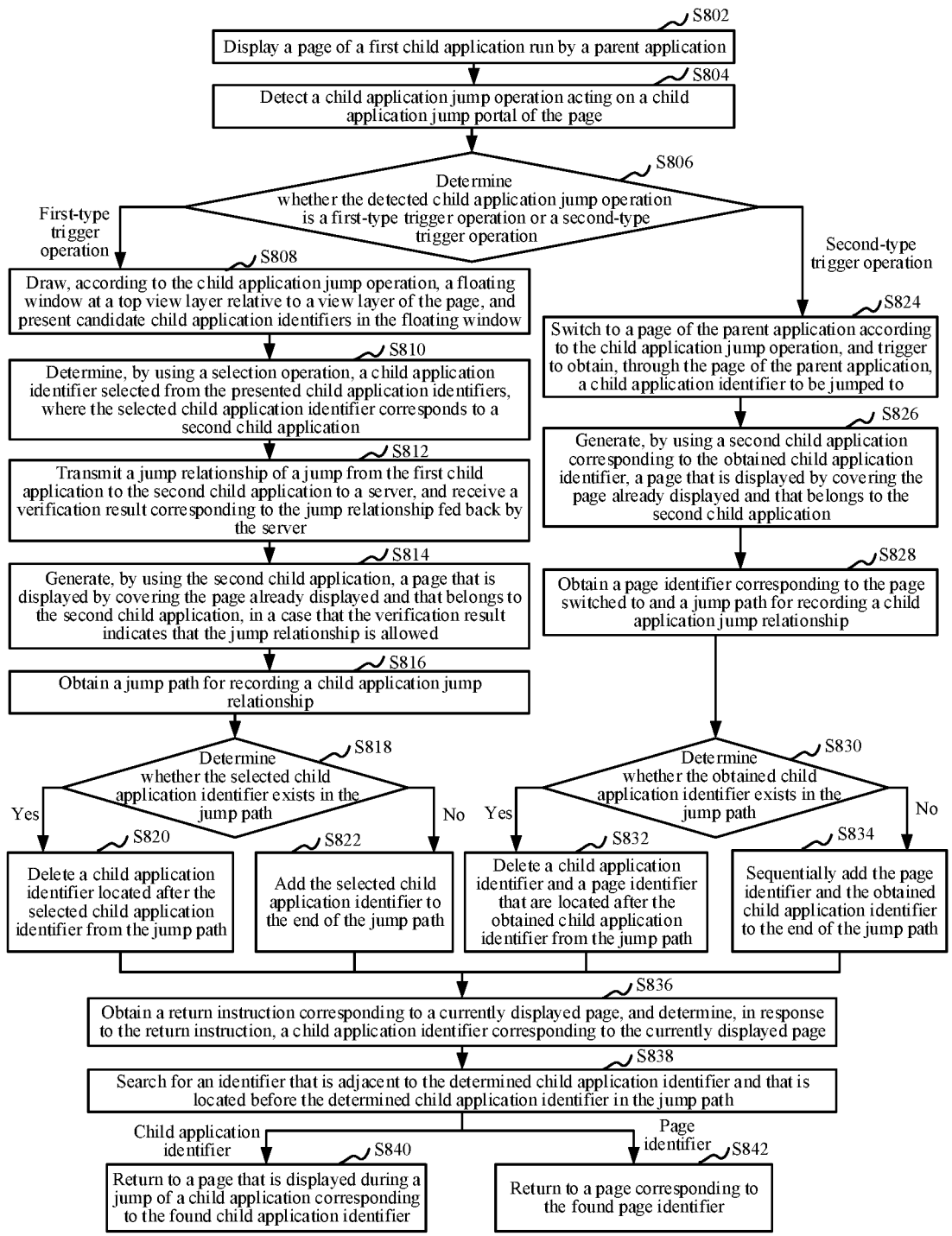
FIG. 8 is a schematic flowchart of an application processing method in an embodiment.

As shown in FIG. 8, in a specific embodiment, the application processing method specifically includes the following steps:

S802. Display a page of a first child application run by a parent application.

S804. Detect a child application jump operation acting on a child application jump portal of the page.

S806. Determine whether the detected child application jump operation is a first-type trigger operation or a second-type trigger operation. If the detected child application jump operation is a first-type trigger operation, perform S808. If the detected child application jump operation is a second-type trigger operation, perform S824.

S808. Draw, according to the child application jump operation, a floating window at a top view layer relative to a view layer of the page, and present candidate child application identifiers in the floating window.

S810. Determine a child application identifier that is selected from the presented child application identifiers through a selection operation, where the selected child application identifier corresponds to a second child application.

S812. Transmit, to a server, a jump relationship of a jump from the first child application to the second child application, and receive a verification result corresponding to the jump relationship fed back by the server.

S814. Generate, by using the second child application, a page that is displayed by covering the page already displayed and that belongs to the second child application, in a case that the verification result indicates that the jump relationship is allowed.

S816. Obtain a jump path for recording a child application jump relationship.

S818. Judge whether the selected child application identifier exists in the jump path. If the selected child application identifier exists in the jump path, perform S820. If the selected child application identifier does not exist in the jump path, perform S822.

S820. Delete a child application identifier located after the selected child application identifier from the jump path.

S822. Add the selected child application identifier to the end of the jump path.

S824. Switch to a page of the parent application according to the child application jump operation, and trigger to obtain, through the page of the parent application, a child application identifier to be jumped to.

S826. Generate, by using a second child application corresponding to the obtained child application identifier, a page that is displayed by covering the page already displayed and that belongs to the second child application.

S828. Obtain a page identifier corresponding to the page switched to and a jump path used for a child application jump relationship.

S830. Determine whether the obtained child application identifier exists in the jump path. If the obtained child application identifier exists in the jump path, perform S832. If the obtained child application identifier does not exist in the jump path, perform S834.

S832. Delete a child application identifier and a page identifier that are located after the obtained child application identifier from the jump path.

S834. Sequentially add the page identifier and the obtained child application identifier to the end of the jump path.

S836. Obtain a return instruction corresponding to a currently displayed page, and determine, in response to the return instruction, a child application identifier corresponding to the currently displayed page.

S838. Search for an identifier that is adjacent to the determined child application identifier and that is located before the determined child application identifier in the jump path. When the found identifier is a child application identifier, perform S840. When the found identifier is a page identifier, perform S842.

S840. Return to a page that is displayed during a jump of a child application corresponding to the found child application identifier.

S842. Return to a page corresponding to the found page identifier.

The first-type trigger operation triggers the first child application to invoke navigateToMiniProgram JSAPI to jump to the second child application. The second-type trigger operation triggers the first child application to open the page of the parent application, and then starts the second child application by using page logic of the parent application. During a return to the child application, navigateBackMiniProgram JSAPI may be invoked to return to the previous child application.

It is to be understood that, although the steps in the flowcharts of the foregoing embodiments are sequentially shown according to the indication of arrows, the steps are not necessarily sequentially performed according to the sequence indicated by the arrows. Unless explicitly specified in this application, the sequence of the steps is not strictly limited, and the steps may be performed in other sequences. Moreover, at least some of the steps in the foregoing embodiments may include a plurality of sub-steps or a plurality of stages. The sub-steps or stages are not necessarily performed at the same moment but may be performed at different moments. The sub-steps or stages are not necessarily performed sequentially, but may be performed in turn or alternately with other steps or at least some sub-steps or stages of other steps.

Figure 9:
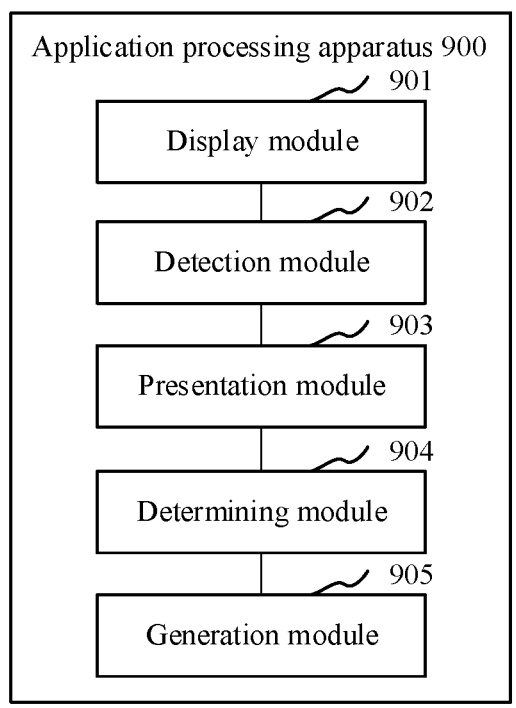
FIG. 9 is a structural diagram of modules of an application processing apparatus in an embodiment.

As shown in FIG. 9, in an embodiment, an application processing apparatus 900 is provided. Referring to FIG. 9, the application processing apparatus 900 includes: a display module 901, a detection module 902, a presentation module 903, a determining module 904, and a generation module 905. The modules included in the application processing apparatus 900 may all or partially be implemented by software, hardware, or a combination thereof.

The display module 901 is configured to display a page of a first child application run by a parent application.

The detection module 902 is configured to detect a child application jump operation corresponding to the page.

The presentation module 903 is configured to present candidate child application identifiers according to the child application jump operation.

The determining module 904 is configured to determine a child application identifier that is selected from the presented child application identifiers through a selection operation.

The generation module 905 is configured to generate, by using a second child application corresponding to the selected child application identifier, a page that is displayed by covering the page already displayed and that belongs to the second child application.

In an embodiment, the detection module 902 is further configured to detect a child application jump operation acting on a child application jump portal of the page. The presentation module 903 is further configured to: draw, according to the child application jump operation, a floating window at a top view layer relative to a view layer of the page; and present the candidate child application identifiers in the floating window.

In an embodiment, the detection module 902 is further configured to detect a child application jump operation triggered by dragging the page. The presentation module 903 is further configured to present, according to the child application jump operation, the candidate child application identifiers in a page area formed by dragging the page.

In an embodiment, the application processing apparatus 900 further includes: a recording module 906, configured to: obtain a jump path for recording a child application jump relationship; delete a child application identifier located after the selected child application identifier from the jump path in a case that the selected child application identifier exists in the jump path; and add the selected child application identifier to the end of the jump path in a case that the selected child application identifier does not exist in the jump path.

In an embodiment, the application processing apparatus 900 further includes: a returning module 907, configured to: obtain a return instruction corresponding to a currently displayed page; determine, in response to the return instruction, a child application identifier corresponding to the currently displayed page; search for a child application identifier that is adjacent to the determined child application identifier and that is located before the determined child application identifier in the jump path; and return to a page that is displayed during a jump of a child application corresponding to the found child application identifier.

Figure 10:
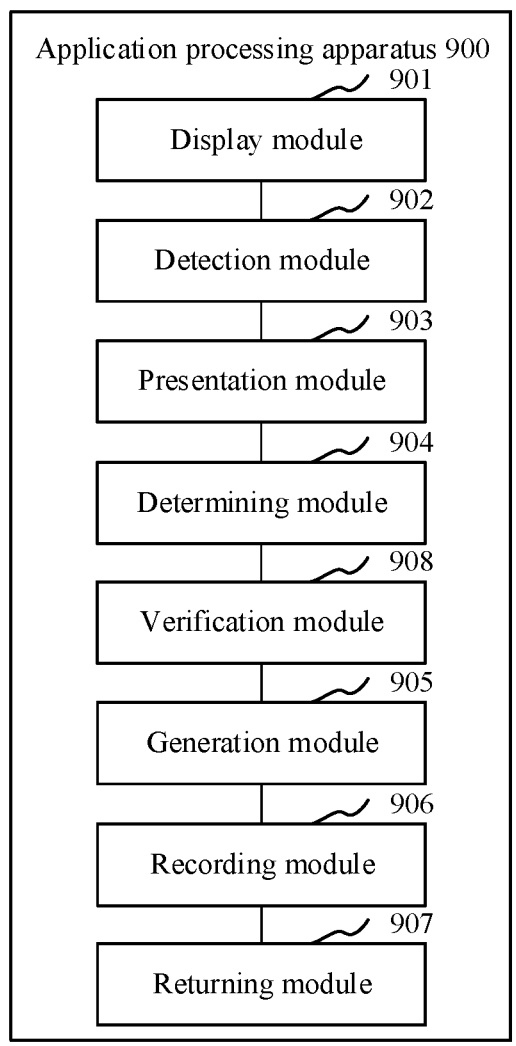
FIG. 10 is a structural diagram of modules of an application processing apparatus in another embodiment.

As shown in FIG. 10, in an embodiment, the application processing apparatus 900 further includes: the recording module 906, the returning module 907, and a verification module 908.

The verification module 908 is configured to: transmit, to a server, a jump relationship of a jump from the first child application to the second child application; and receive a verification result corresponding to the jump relationship fed back by the server.

The generation module 905 is further configured to: generate, by using the second child application corresponding to the selected child application identifier, a page that is displayed by covering the page already displayed and that belongs to the second child application, in a case that the verification result indicates that the jump relationship is allowed.

In an embodiment, the presentation module 903 is further configured to: present the candidate child application identifiers according to the child application jump operation in a case that the child application jump operation is a first-type jump operation; switch to a page of the parent application according to the child application jump operation in a case that the child application jump operation is a second-type jump operation; and trigger to obtain, through the page of the parent application, a child application identifier to be jumped to. The generation module 905 is further configured to generate, by using the second child application corresponding to the obtained child application identifier, a page that is displayed by covering the page already displayed and that belongs to the second child application.

In an embodiment, the recording module 906 is further configured to: obtain a page identifier corresponding to the page switched to and a jump path for recording a child application jump relationship; delete a child application identifier and a page identifier that are located after the obtained child application identifier from the jump path in a case that the obtained child application identifier exists in the jump path; and sequentially add the page identifier and the obtained child application identifier to the end of the jump path in a case that the obtained child application identifier does not exist in the jump path.

Figure 11:
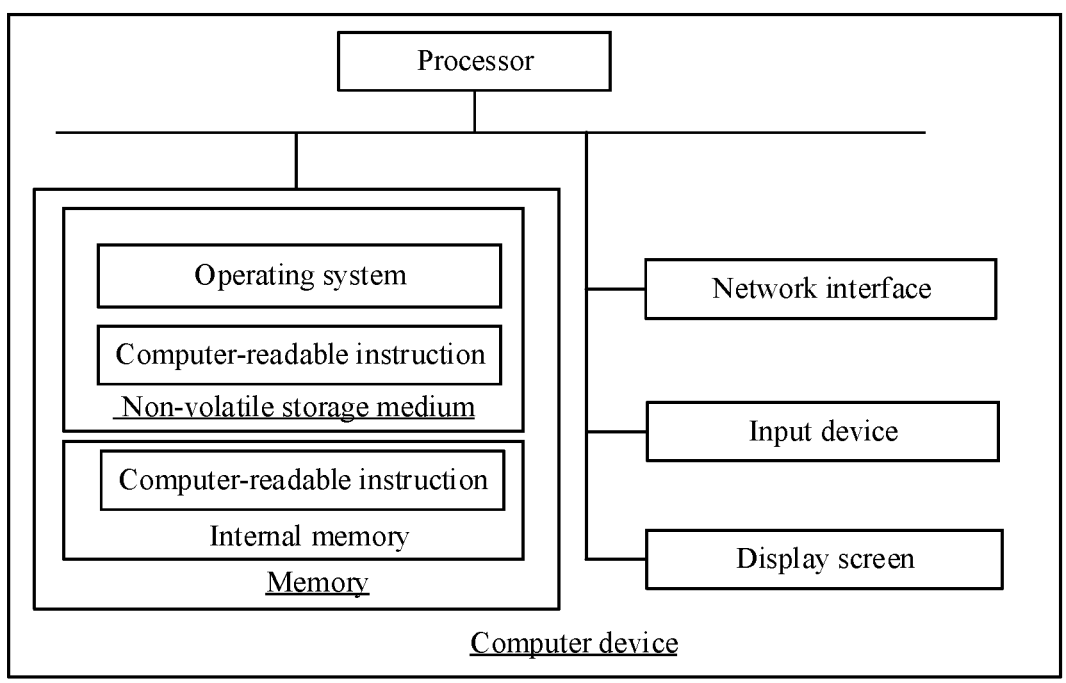
FIG. 11 is a diagram of an internal structure of a computing device in an embodiment.

FIG. 11 is a diagram of an internal structure of a computing device in an embodiment. The computing device may be specifically the terminal 110 in FIG. 1. As shown in FIG. 11, the computing device includes a processor, a memory, and a network interface, an input device and a display screen that are connected through a system bus. The memory includes a non-volatile storage medium and an internal memory. The non-volatile storage medium of the computing device stores an operating system, and may further store computer-readable instructions, the computer-readable instructions, when executed by the processor, causing the processor to implement an application processing method. The internal memory may also store computer-readable instructions, the computer-readable instructions, when executed by the processor, causing the processor to perform the application processing method. The display screen of the computing device may be a liquid crystal display screen, an e-ink display screen, or the like. The input device may be a touch layer covering the display screen, or may be a button, a trackball, or a touchpad disposed on a housing of the computing device, or may be an external keyboard, touchpad, mouse or the like. A person skilled in the art may understand that, the structure shown in FIG. 11 is only a block diagram of a partial structure related to the solution in this application, and does not limit the computing device to which the solution of this application is applied. Specifically, the computing device may include more components or fewer components than those shown in the figure, or some components may be combined, or a different component deployment may be used.

In an embodiment, the application processing apparatus provided in this application may be implemented in a form of computer-readable instructions. The computer-readable instructions may be run on the computing device shown in FIG. 11, and the non-volatile storage medium of the computing device may store instruction modules constituting the application processing apparatus, for example, the display module 901, the detection module 902, the presentation module 903, the determining module 904, and the generation module 905 shown in FIG. 9. The computer-readable instructions constituted by the instruction modules cause the processor to perform the steps in the application processing methods in the embodiments of this application described in this specification.

For example, the computing device shown in FIG. 11 may display, through the display module 901 in the application processing apparatus 900 shown in FIG. 9, a page of a first child application run by a parent application. The detection module 902 is configured to detect a child application jump operation corresponding to the page. The presentation module 903 is configured to present candidate child application identifiers according to the child application jump operation. The determining module 904 is configured to determine a child application identifier that is selected from the presented child application identifiers through a selection operation. The generation module 905 is configured to generate, by using a second child application corresponding to the selected child application identifier, a page that is displayed by covering the page already displayed and that belongs to the second child application.

In an embodiment, a computer-readable storage medium is provided. The computer-readable storage medium stores computer-readable instructions, the computer-readable instructions, when executed by a processor, causing the processor to perform the following steps: displaying a page of a first child application run by a parent application; detecting a child application jump operation corresponding to the page; presenting candidate child application identifiers according to the child application jump operation; determining a child application identifier that is selected from the presented child application identifiers through a selection operation; and generating, by using a second child application corresponding to the selected child application identifier, a page that is displayed by covering the page already displayed and that belongs to the second child application.

In an embodiment, the detecting a child application jump operation corresponding to the page includes: detecting a child application jump operation acting on a child application jump portal of the page. The presenting candidate child application identifiers according to the child application jump operation includes: drawing, according to the child application jump operation, a floating window at a top view layer relative to a view layer of the page; and presenting the candidate child application identifiers in the floating window.

In an embodiment, the detecting a child application jump operation corresponding to the page includes: detecting a child application jump operation triggered by dragging the page. The presenting candidate child application identifiers according to the child application jump operation includes: presenting, according to the child application jump operation, the candidate child application identifiers in a page area formed by dragging the page.

In an embodiment, the computer-readable instructions, when executed by the processor, further cause the processor to perform the following steps: obtaining a jump path for recording a child application jump relationship; deleting a child application identifier located after the selected child application identifier from the jump path in a case that the selected child application identifier exists in the jump path; and adding the selected child application identifier to the end of the jump path in a case that the selected child application identifier does not exist in the jump path.

In an embodiment, the computer-readable instructions, when executed by the processor, further cause the processor to perform the following steps: obtaining a return instruction corresponding to a currently displayed page; determining, in response to the return instruction, a child application identifier corresponding to the currently displayed page; searching for a child application identifier that is adjacent to the determined child application identifier and that is located before the determined child application identifier in the jump path; and returning to a page that is displayed during a jump of a child application corresponding to the found child application identifier.

In an embodiment, the computer-readable instructions, when executed by the processor, further cause the processor to perform the following steps: transmitting, to a server, a jump relationship of a jump from the first child application to the second child application; receiving a verification result corresponding to the jump relationship fed back by the server; and executing, by using the second child application corresponding to the selected child application identifier, the operation of generating a page that is displayed by covering the page already displayed and that belongs to the second child application, in a case that the verification result indicates that the jump relationship is allowed.

In an embodiment, the computer-readable instructions, when executed by the processor, further cause the processor to perform the following steps: continuously performing the step of presenting candidate child application identifiers according to the child application jump operation in a case that the child application jump operation is a first-type jump operation; switching to a page of the parent application according to the child application jump operation in a case that the child application jump operation is a second-type jump operation; triggering to obtain, through the page of the parent application, a child application identifier to be jumped to; and generating, by using the second child application corresponding to the obtained child application identifier, a page that is displayed by covering the page already displayed and that belongs to the second child application.

In an embodiment, the computer-readable instructions, when executed by the processor, further cause the processor to perform the following steps: obtaining a page identifier corresponding to the page switched to and a jump path for recording a child application jump relationship; deleting a child application identifier and a page identifier that are located after the obtained child application identifier from the jump path in a case that the obtained child application identifier exists in the jump path; and sequentially adding the page identifier and the obtained child application identifier to the end of the jump path in a case that the obtained child application identifier does not exist in the jump path.

In an embodiment, a computing device is provided, including a memory and a processor, the memory storing computer-readable instructions, and the computer-readable instructions, when executed by the processor, causing the processor to perform the following steps: displaying a page of a first child application run by a parent application; detecting a child application jump operation corresponding to the page; presenting candidate child application identifiers according to the child application jump operation; determining a child application identifier that is selected from the presented child application identifiers through a selection operation; and generating, by using a second child application corresponding to the selected child application identifier, a page that is displayed by covering the page already displayed and that belongs to the second child application.

In an embodiment, the detecting a child application jump operation corresponding to the page includes: detecting a child application jump operation acting on a child application jump portal of the page. The presenting candidate child application identifiers according to the child application jump operation includes: drawing, according to the child application jump operation, a floating window at a top view layer relative to a view layer of the page; and presenting the candidate child application identifiers in the floating window.

In an embodiment, the detecting a child application jump operation corresponding to the page includes: detecting a child application jump operation triggered by dragging the page. The presenting candidate child application identifiers according to the child application jump operation includes: presenting, according to the child application jump operation, the candidate child application identifiers in a page area formed by dragging the page.

In an embodiment, the computer-readable instructions, when executed by the processor, further cause the processor to perform the following steps: obtaining a jump path for recording a child application jump relationship; deleting a child application identifier located after the selected child application identifier from the jump path in a case that the selected child application identifier exists in the jump path; and adding the selected child application identifier to the end of the jump path in a case that the selected child application identifier does not exist in the jump path.

In an embodiment, the computer-readable instructions, when executed by the processor, further cause the processor to perform the following steps: obtaining a return instruction corresponding to a currently displayed page; determining, in response to the return instruction, a child application identifier corresponding to the currently displayed page; searching for a child application identifier that is adjacent to the determined child application identifier and that is located before the determined child application identifier in the jump path; and returning to a page that is displayed during a jump of a child application corresponding to the found child application identifier.

In an embodiment, the computer-readable instructions, when executed by the processor, further cause the processor to perform the following steps: transmitting, to a server, a jump relationship of a jump from the first child application to the second child application; receiving a verification result corresponding to the jump relationship fed back by the server; and executing, by using the second child application corresponding to the selected child application identifier, the operation of generating a page that is displayed by covering the page already displayed and that belongs to the second child application, in a case that the verification result indicates that the jump relationship is allowed.

In an embodiment, the computer-readable instructions, when executed by the processor, further cause the processor to perform the following steps: continuously performing the step of presenting candidate child application identifiers according to the child application jump operation in a case that the child application jump operation is a first-type jump operation; switching to a page of the parent application according to the child application jump operation in a case that the child application jump operation is a second-type jump operation; triggering to obtain, through the page of the parent application, a child application identifier to be jumped to; and generating, by using the second child application corresponding to the obtained child application identifier, a page that is displayed by covering the page already displayed and that belongs to the second child application.

In an embodiment, the computer-readable instructions, when executed by the processor, further cause the processor to perform the following steps: obtaining a page identifier corresponding to the page switched to and a jump path for recording a child application jump relationship; deleting a child application identifier and a page identifier that are located after the obtained child application identifier from the jump path in a case that the obtained child application identifier exists in the jump path; and sequentially adding the page identifier and the obtained child application identifier to the end of the jump path in a case that the obtained child application identifier does not exist in the jump path.

A person of ordinary skill in the art may understand that some or all procedures in the methods in the foregoing embodiments may be implemented by a computer-readable instruction instructing related hardware, the program may be stored in a non-volatile computer readable storage medium, and when the program is executed, the procedures in the foregoing method embodiments may be implemented. Any reference to the memory, storage, a database, or other media used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash. The volatile memory may include a random access memory (RAM) or an external cache. As an illustration instead of a limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synchronization link (Synchlink) DRAM (SLDRAM), a rambus direct RAM (RDRAM), a direct rambus dynamic RAM (DRDRAM), and a rambus dynamic RAM (RDRAM).

The technical features in the foregoing embodiments may be randomly combined. To make the description concise, not all possible combinations of the technical features in the foregoing embodiments are described. However, combinations of the technical features shall all be considered as falling within the scope described in this specification provided that the combinations of the technical features do not conflict with each other.

The foregoing embodiments only describe several implementations of this application, which are described specifically and in detail, and therefore cannot be construed as a limitation to the patent scope of the present disclosure. A person of ordinary skill in the art may further make variations and improvements without departing from the ideas of this application, which all fall within the protection scope of this application. Therefore, the protection scope of the patent of this application shall be subject to the appended claims.

What is claimed is:

1. An application processing method, performed by a computing device, the method comprising:
   displaying a first page of a first child application managed by a parent application, wherein the parent application is a social networking application having a plurality of users and the first child application is hosted by the parent application and accessible to a subset of the plurality of users and the first page of the first child application includes a child application jump portal;

detecting a child application jump operation corresponding to the first page in response to a user selection of the child application jump portal;

presenting, in the first page, candidate child application identifiers according to the child application jump operation;

determining a child application identifier that is selected from the presented child application identifiers through a user selection operation; and generating, by using a second child application corresponding to the user-selected child application identifier, a second page that is displayed by covering the first page already displayed and that belongs to the second child application.

2. The method according to claim 1, wherein the detecting the child application jump operation corresponding to the first page in response to the user selection of the child application jump portal comprises:

detecting the child application jump operation acting on the child application jump portal of the first page; and the displaying candidate child application identifiers according to the child application jump operation comprises:

drawing, according to the child application jump operation, a floating window at a top view layer relative to a view layer of the first page; and presenting the candidate child application identifiers in the floating window.

3. The method according to claim 1, wherein the detecting the child application jump operation corresponding to the first page in response to the user selection of the child application jump portal comprises:

detecting the child application jump operation triggered by dragging the first page; and the presenting, in the first page, candidate child application identifiers according to the child application jump operation comprises:

presenting, according to the child application jump operation, the candidate child application identifiers in a page area formed by dragging the first page.

4. The method according to claim 1, further comprising:

obtaining a jump path for recording a child application jump relationship;

deleting a child application identifier located after the selected child application identifier from the jump path in a case that the selected child application identifier exists in the jump path; and adding the selected child application identifier to the end of the jump path in a case that the selected child application identifier does not exist in the jump path.

5. The method according to claim 4, further comprising:

obtaining a return instruction corresponding to a currently displayed page;

determining, in response to the return instruction, a child application identifier corresponding to the currently displayed page;

searching for a child application identifier that is adjacent to the determined child application identifier and that is located before the determined child application identifier in the jump path; and returning to a page that is displayed during a jump of a child application corresponding to the found child application identifier.

6. A computing device, comprising memory and a processor, the memory storing a plurality of computer programs, and the computer programs, when executed by the processor, causing the processor to perform a plurality of operations including:

displaying a first page of a first child application managed by a parent application, wherein the parent application is a social networking application having a plurality of users and the first child application is hosted by the parent application and accessible to a subset of the plurality of users and the first page of the first child application includes a child application jump portal;

detecting a child application jump operation corresponding to the first page in response to a user selection of the child application jump portal;

presenting, in the first page, candidate child application identifiers according to the child application jump operation;

determining a child application identifier that is selected from the presented child application identifiers through a user selection operation; and generating, by using a second child application corresponding to the user-selected child application identifier, a second page that is displayed by covering the first page already displayed and that belongs to the second child application.

7. The computing device according to claim 6, wherein the detecting the child application jump operation corresponding to the first page in response to the user selection of the child application jump portal comprises:

detecting the child application jump operation acting on the child application jump portal of the first page; and the displaying candidate child application identifiers according to the child application jump operation comprises:

drawing, according to the child application jump operation, a floating window at a top view layer relative to a view layer of the first page; and presenting the candidate child application identifiers in the floating window.

8. The computing device according to claim 6, wherein the detecting the child application jump operation corresponding to the first page in response to the user selection of the child application jump portal comprises:

detecting the child application jump operation triggered by dragging the first page; and the presenting, in the first page, candidate child application identifiers according to the child application jump operation comprises:

presenting, according to the child application jump operation, the candidate child application identifiers in a page area formed by dragging the first page.

9. The computing device according to claim 6, wherein the plurality of operations further comprise:

obtaining a jump path for recording a child application jump relationship;

deleting a child application identifier located after the selected child application identifier from the jump path in a case that the selected child application identifier exists in the jump path; and adding the selected child application identifier to the end of the jump path in a case that the selected child application identifier does not exist in the jump path.

10. The computing device according to claim 9, wherein the plurality of operations further comprise:

obtaining a return instruction corresponding to a currently displayed page;

determining, in response to the return instruction, a child application identifier corresponding to the currently displayed page;

searching for a child application identifier that is adjacent to the determined child application identifier and that is located before the determined child application identifier in the jump path; and returning to a page that is displayed during a jump of a child application corresponding to the found child application identifier.

11. A non-transitory computer readable storage medium storing computer-readable instructions, the computer-readable instructions, when executed by one or more processors of a computing device, causing the one or more processors to perform operations including:

displaying a first page of a first child application managed by a parent application, wherein the parent application is a social networking application having a plurality of users and the first child application is hosted by the parent application and accessible to a subset of the plurality of users and the first page of the first child application includes a child application jump portal;

detecting a child application jump operation corresponding to the first page in response to a user selection of the child application jump portal;

presenting, in the first page, candidate child application identifiers according to the child application jump operation;

determining a child application identifier that is selected from the presented child application identifiers through a user selection operation; and generating, by using a second child application corresponding to the user-selected child application identifier, a second page that is displayed by covering the first page already displayed and that belongs to the second child application.

12. The non-transitory computer readable storage medium according to claim 11, wherein the plurality of operations further comprise:

obtaining a jump path for recording a child application jump relationship;

deleting a child application identifier located after the selected child application identifier from the jump path in a case that the selected child application identifier exists in the jump path; and adding the selected child application identifier to the end of the jump path in a case that the selected child application identifier does not exist in the jump path.

* * * * *